(12) United States Patent
Chan et al.

(10) Patent No.: US 6,873,780 B2
(45) Date of Patent: Mar. 29, 2005

(54) METHOD FOR FABRICATING AN ARRAY OF OPTICAL FIBERS HAVING ANGLED END FACES

(75) Inventors: Eric Y. Chan, Mercer Island, WA (US); Dennis G. Koshinz, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 151 days.

(21) Appl. No.: 10/178,032

(22) Filed: Jun. 21, 2002

(65) Prior Publication Data

US 2003/0235366 A1 Dec. 25, 2003

(51) Int. Cl.$^7$ ................................................ G02B 6/00
(52) U.S. Cl. ............................................. 385/137
(58) Field of Search ................ 385/76–80, 134–137, 385/147

(56) References Cited

U.S. PATENT DOCUMENTS 5,216,741 A * 6/1993 Blijleven et al. ............ 385/137
6,466,310 B2 * 10/2002 Nguyen et al. ............. 356/73.1

* cited by examiner

Primary Examiner—Khiem Nguyen
(74) Attorney, Agent, or Firm—Alston & Bird LLP

(57) ABSTRACT

A method for fabricating an array of optical fibers having respective angled end faces is provided which permits the entire array of optical fibers to be polished at the same time without requiring that the entire array be scrapped if one or more of the optical fibers has a defect. A plurality of optical fibers are temporarily secured, such as by means of wax, to a holding fixture such that the end faces of the optical fibers are exposed. The end faces of the optical fibers are then polished such that the resulting polished end faces are disposed at an angle. The optical fibers may then be removed from the holding fixture. If the optical fibers are temporarily secured to the holding fixture with wax, the wax is at least partially melted prior to removing the optical fibers therefrom. The optical fibers may then be assembled in an array.

30 Claims, 3 Drawing Sheets

METHOD FOR FABRICATING AN ARRAY OF OPTICAL FIBERS HAVING ANGLED END FACES

FIELD OF THE INVENTION

The present invention relates generally to optical fiber arrays and, more particularly, to methods for fabricating an array of optical fibers that have respective angled end faces.

BACKGROUND OF THE INVENTION

Arrays of optical fibers having angled end faces are desirable for a wide variety of applications. An array of optical fibers having angled end faces generally includes a ferrule and a plurality of optical fibers mounted within the ferrule. These arrays may utilize various types of multifiber ferrules including ferrules having conventional form factors such as MT ferrules or v-groove ferrules. As is known, MT ferrules generally define a plurality of cylindrical bores through which the optical fibers extend, while v-groove ferrules typically consist of a pair of ferrule halves formed of silicon with at least one and, more typically, both of the ferrule halves defining a plurality of lengthwise extending grooves, such as a plurality of lengthwise extending v-shaped grooves. Regardless of the form factor, the optical fibers are mounted within the ferrule, such as by extending through the bores or the grooves defined by the ferrule. The optical fibers are mounted within the ferrule such that end portions of the optical fibers protrude beyond the front face of the ferrule. Moreover, the end faces of the optical fibers that protrude beyond the front face of the ferrule are angled relative to the longitudinal axes defined by the optical fibers. While the end faces may be disposed at a variety of angles, the end faces are typically disposed at about an angle of 45° relative to the longitudinal axes.

Arrays of optical fibers having angled end faces can be utilized to couple optical signals between various devices, such as various optoelectronic devices, including, for example, a photo-diode array or an array of vertical cavity surface emitting lasers (VCSELs). As shown in FIG. 1 in which the optoelectronic device is an array of VCSELs 10, the VCSELs emit optical signals perpendicular to the plane defined by the substrate 12 upon which the VCSELs are mounted. The optical fibers 14 receive the optical signals emitted by the array of VCSELs via the angled end faces 16 as described below. The optical fibers generally extend to and are in communication with another device, such as another optoelectronic device including, for example a photodetector array, i.e., a receiver. Thus, this array of optical fibers facilitates communication between the VCSEL-based transmitter and the photodiode receiver.

In the absence of an array of optical fibers having angled end faces, the optical signals emitted by the VCSEL array would generally be coupled to optical fibers having end faces that are parallel to the VCSEL or the surface plane of the photodetector. These fibers would therefore extend perpendicularly from the VCSEL or photodetector array. By utilizing an array of optical fibers having angled end faces as shown in FIG. 1, however, the array of optical fibers may be positioned in a generally horizontal plane relative to the VCSEL array such that the angled end faces of the optical fibers are disposed in alignment with respective optical signals emitted by the VCSEL array. Advantageously, the spacing between the end faces of the optical fibers and the VCSEL array may be quite small, such as 50–100 microns, thereby potentially reducing the size and profile of the resulting package. The optical signals emitted by the VCSEL array propagate through the side surface of respective optical fiber and are internally reflected by the angled end face so as to then propagate lengthwise along the optical fiber. Thus, the angle at which the end faces are disposed relative to the longitudinal axes of the optical fibers may vary, but is generally defined by Snell's law, such that the optical signals are totally internally reflected within the optical fibers. In addition, the spacing between the optoelectronic devices and other devices, such as application specific integrated circuits (ASICs), associated with the optoelectronic devices is minimized, thereby allowing shorter electrical bond wires. These bond wires electrically connect the VCSEL and/or the photodiode array with the ASIC. Shorter bond wires correspondingly reduce parasitic capacitance and induction and their deleterious effects upon the optical signal. Thus, the resulting optoelectronic circuit can generally operate at greater speeds as desired for Fibre Channel and gigabit Ethernet.

Arrays of optical fibers having angled end faces have generally been fabricated in two different manners. According to one technique, each optical fiber is individually polished such that the end face has a predefined angle relative to the longitudinal axis of the optical fiber. The optical fibers that have been individually polished are then mounted within a ferrule such that the angled end faces protrude beyond the front face of the ferrule by a predefined distance. As will be apparent, the individual polishing of each optical fiber can be a time-consuming process and typically requires substantially consistent polishing operations such that each optical fiber has an end face disposed at nearly the same angle.

Instead of individually polishing the optical fibers, the optical fibers can be mounted within a ferrule such that end portions of the optical fibers protrude beyond the front face of the ferrule by at least a predetermined distance. Thereafter, the end faces of the optical fibers may be concurrently polished until the end faces define the desired angle relative to the longitudinal axes of the optical fibers. Unfortunately, an error that occurs during mounting of the optical fibers or polishing of the optical fibers that may affect only one or a small number of the optical fibers will generally cause the entire array to be scrapped even though other optical fibers may have been appropriately mounted and polished, thereby disadvantageously increasing the cost of the resulting arrays of optical fibers having angled end faces. For example, if the tip of a single optical fiber is broken during the polishing process, the entire array may have to be scrapped even though the other optical fibers are acceptable.

As such, it would be desirable to develop an improved method for fabricating an array of optical fibers having angled end faces, especially in light of the increasing demand for these arrays for use with VCSEL arrays, photodiode arrays and other optoelectronic devices.

SUMMARY OF THE INVENTION

A method for fabricating an array of optical fibers having respective angled end faces is therefore provided which permits the entire array of optical fibers to be polished at the same time without requiring that the entire array of optical fibers be scrapped if one or more of the optical fibers has a defect. Thus, the method of the present invention may be more economical than conventional methods of fabricating an array of optical fibers having angled end faces.

According to the method of the present invention, a plurality of optical fibers are temporarily secured to a holding fixture, such as a first ferrule, such that the end faces of the optical fibers are exposed. The optical fibers may be temporarily secured to the holding fixture by means of a wax. In this regard, at least portions of the optical fibers may be coated with a wax that is then permitted to at least partially solidify, thereby securing the optical fibers to the holding fixture. Once temporarily secured to the holding fixture, the end faces of the optical fibers are polished such that the resulting polished end faces are disposed at an angle with respect to the respective longitudinal axes defined by the optical fibers. In one embodiment, not only are the end faces of the optical fibers polished, but also at least that portion of the front face of the first ferrule within which the optical fibers are secured that is proximate the end faces of the optical fibers is also polished at the same angle. After polishing the end faces of the optical fibers, the end faces of the optical fibers may be coated with either a reflective coating or an anti-reflective coating, if desired.

The optical fibers having the polished end faces may then be removed from the holding fixture. In those embodiments in which the optical fibers are temporarily secured to the holding fixture by means of a wax, the wax is at least partially melted prior to removing the optical fibers therefrom. If desired, the optical fibers may be cleaned so as to at least partially remove the wax following the removal of the optical fibers from the holding fixture. The optical fibers may then be arranged in the array, such as by being mounted within a second ferrule.

Prior to removing the optical fibers from the holding fixture, the optical fibers and, in particular, the end faces of the optical fibers may be inspected with a goal to detect any defects. If a defect, such as a scratch or chip, is noted, the plurality of optical fibers may be at least partially released from the holding fixture. In those embodiments in which the optical fibers have been temporarily secured to the holding fixture by means of a wax, the optical fibers may be at least partially released by at least partially melting the wax. The plurality of optical fibers may then be advanced relative to the holding fixture such that the end portions of the optical fibers protrude further beyond the holding fixture. The plurality of optical fibers may then again be temporarily secured to the holding fixture, such as by permitting the wax to at least partially resolidify following the advancement of the optical fibers relative to the holding fixture. The end faces of the optical fibers may then be polished to produce the desired angled end faces. As such, the method of this aspect of the present invention permits optical fibers having defects to be reworked without scrapping the entire array.

Therefore, the method of the present invention permits the end faces of all of the optical fibers of the array to be concurrently polished, thereby expediting the fabrication process. However, in instances in which one or more of the optical fibers are damaged during the polishing or any other portion of the fabrication process, the optical fibers may be repositioned within the holding fixture and the polishing of the end faces of the optical fibers may be repeated. Thus, the method of the present invention permits the same optical fibers to be reworked, such as by being repolished in instances in which one or more of the optical fibers are damaged during the fabrication process without having to scrap the entire array.

BRIEF DESCRIPTION OF THE DRAWINGS

Figure 1:
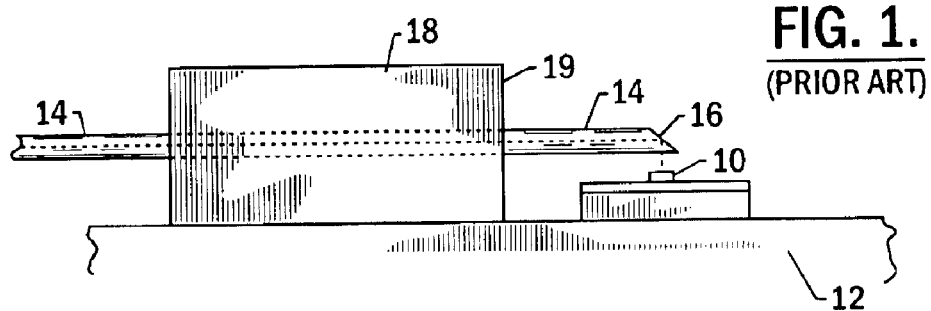
Figure 2:
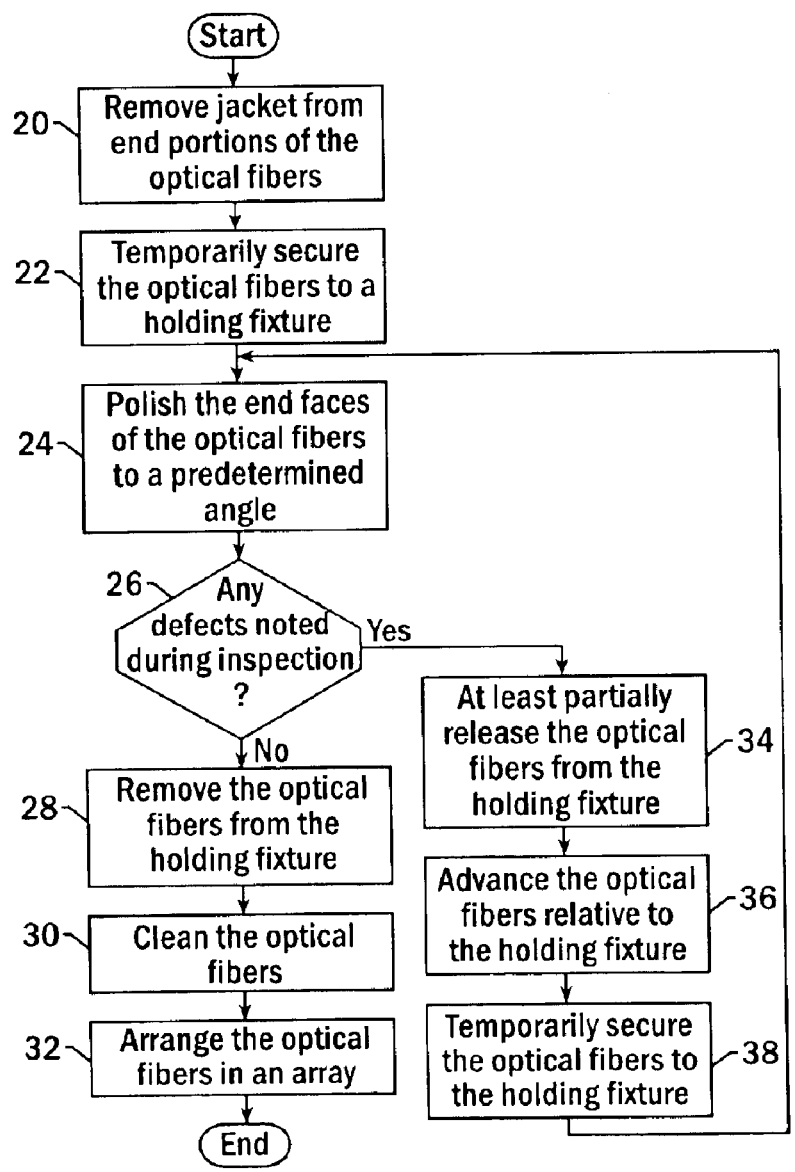
Figure 3:
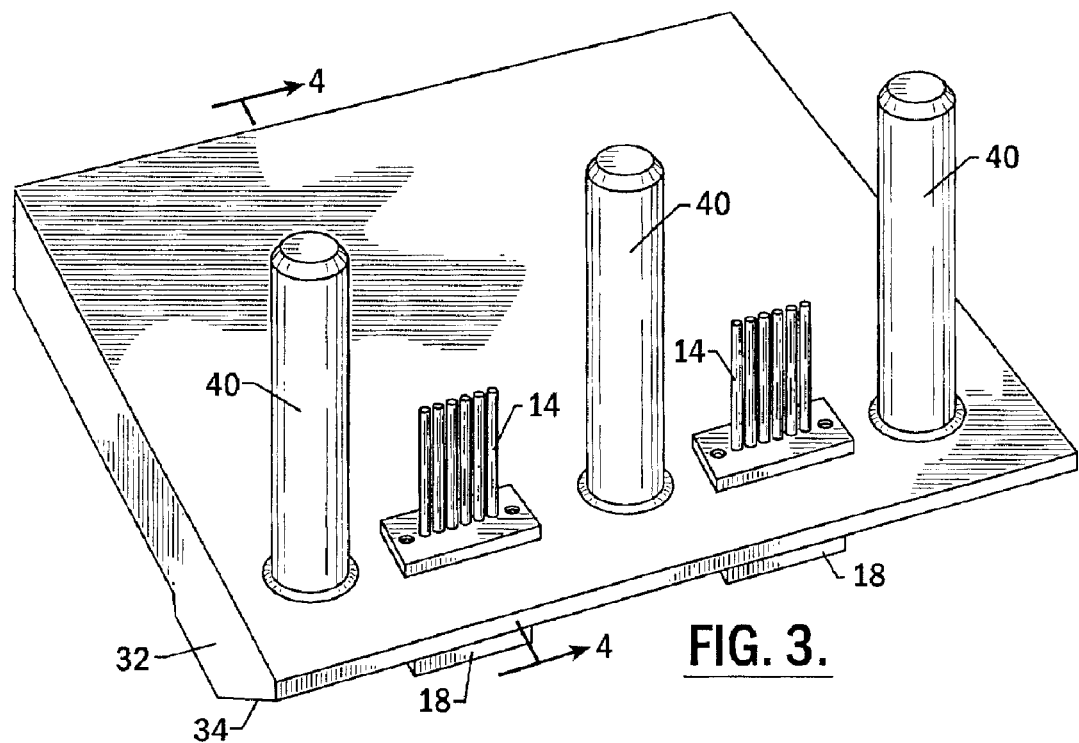
Figure 4:
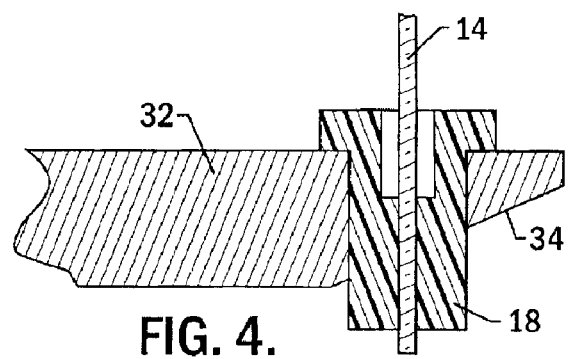
Figure 5:
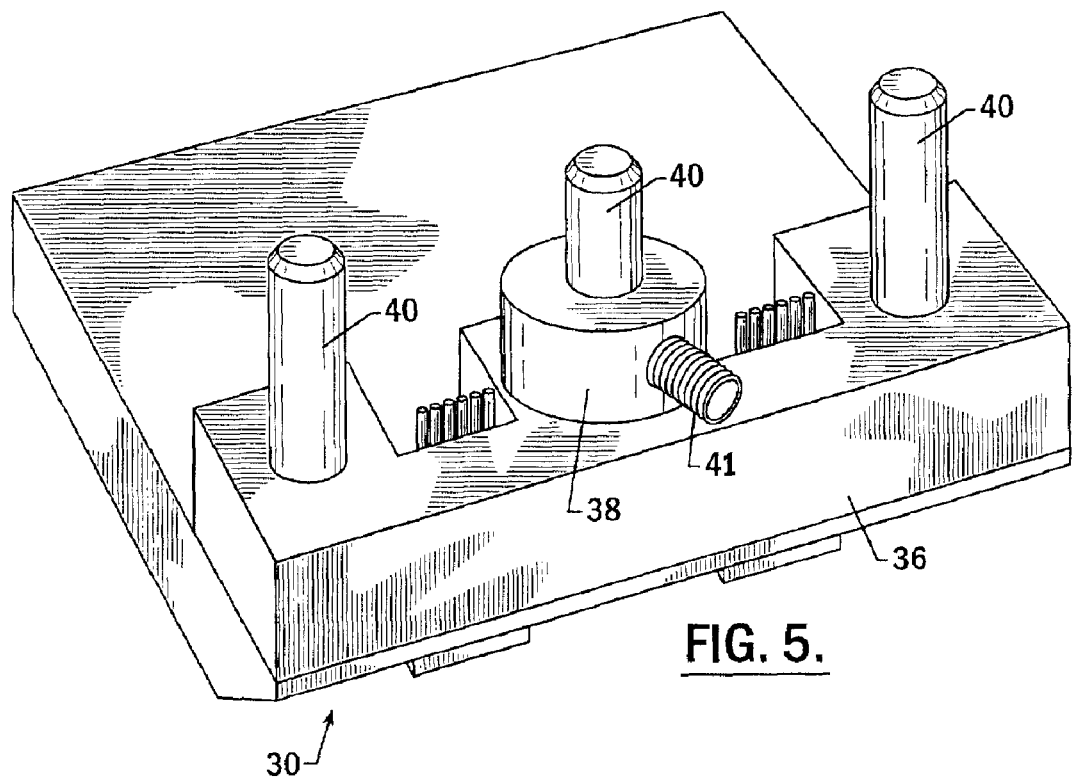
Figure 6:
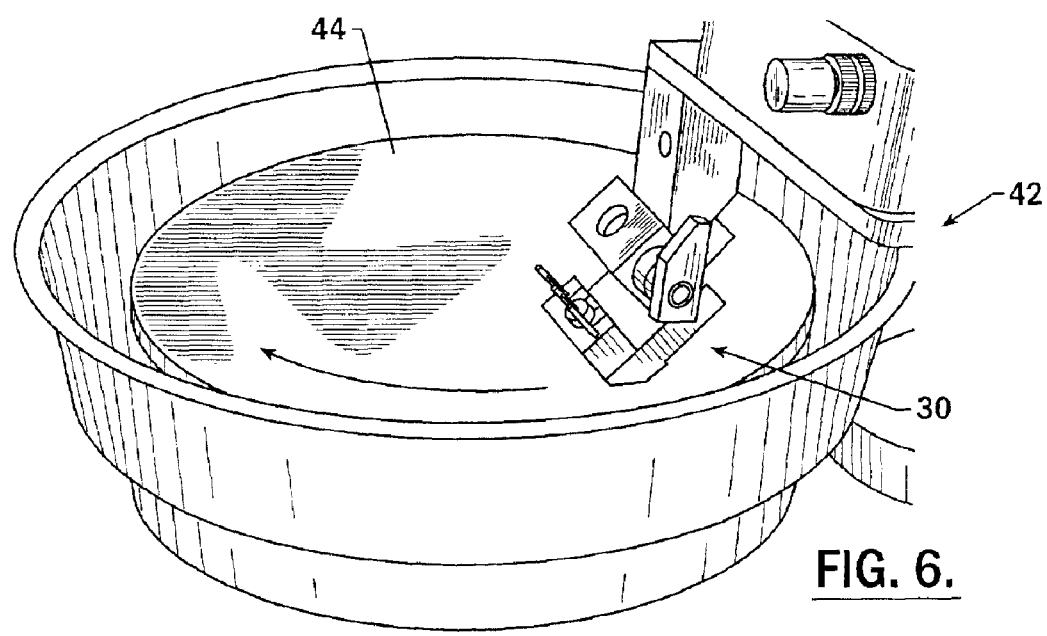

Having thus described the invention in general terms, reference will now be made to the accompanying drawings, which are not necessarily drawn to scale, and wherein:

FIG. 1 is a side view of an array of optical fibers having respective angled end faces for receiving optical signals from an array of vertically emitting optoelectronic devices, such as an array of VCSELs;

FIG. 2 is a flow chart illustrating operations performed in accordance with the method of one embodiment of the present invention;

FIG. 3 is a perspective view of a portion of a polishing fixture in which a pair of ferrules have been mounted;

FIG. 4 is a cross-sectional view of the portion of the polishing fixture depicted in FIG. 3 taken along the line 4—4;

FIG. 5 is a perspective view of the polishing fixture of FIG. 3 following the mounting of the clamp and clamp lock thereupon; and FIG. 6 is a perspective view of a fiber polishing apparatus including the polishing fixture of FIGS. 3–5.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A method for fabricating an array of optical fibers is provided according to the present invention. Typically, the optical fibers of the resulting array have respective angled end faces. As such, the array of optical fibers may be utilized in various applications including the coupling of optical signals to and/or from devices that receive or emit optical signals in a vertical direction as opposed to within a generally horizontal plane defined by the substrate upon which the device is mounted. By way of example, FIG. 1 depicts an array of VCSELs 10 that emit optical signals in a vertical direction. The array of optical fibers 14 fabricated according to the present invention may be positioned in an aligned relationship above the array of VCSELs so as to receive the optical signals and to transmit the optical signal to another device (not shown), such as a detector array that functions as a receiver. In this regard, the angled end faces 16 of the optical fibers are preferably aligned with respective ones of the VCSELs. As explained above, the angled end faces of the optical fibers permit the optical signals emitted by the array of VCSELs to be totally internally reflected within the optical fibers as indicated by the dashed line in FIG. 1. While the array of optical fibers having respective angled end faces is particularly advantageous for coupling the optical signals emitted by an array of VCSELs to a detector array or other optoelectronic device, the array of optical fibers having respective angled end faces may couple other optoelectronic devices, such as by coupling to an array of photodiodes, waveguides, MEMS or other optoelectronic devices. Moreover, while orientational designations such as vertical and horizontal are used herein, these orientational designations are utilized for purposes of example and explanation and not of limitation since other orientations are also supported.

By utilizing an array of optical fibers 14 having respective angled end faces 16, the optoelectronic devices, such as an array of VCSELs 10, a photodiode array, or other optoelectronic device, may be disposed in a relatively small package having a low profile. In addition, the array of optical fibers having respective angled end faces permit the optoelectronic devices to be placed in close proximity to electronic components, such as transmitter and receiver ASICs, thereby reducing the parasitic capacitance and inductance and correspondingly increasing the potential speed at which the system may operate. For example, the speed of the system may exceed 2 gigabits per second for each channel, a speed sufficient to support Fibre Channel and gigabit Ethernet.

As shown in FIG. 1, the array of optical fibers 14 having respective angled end faces 16 generally includes a plurality of optical fibers, such as 4, 8, 12 or more optical fibers, generally disposed in the linear array. The array of optical fibers is generally mounted within a ferrule 18 which serves to fix the positions of the optical fibers and, in particular, the respective angled end faces of the optical fibers relative to one another. The ferrule may have a conventional form factor, such as an MT ferrule or a v-groove ferrule as described above, or may have some other non-standard form factor, if so desired. Regardless of the form factor, the ferrule defines a plurality of lengthwise extending bores or grooves through which respective optical fibers extend. Generally, the optical fibers are secured within the respective bores or grooves by means of an epoxy such that the angled end faces extend beyond the front face 19 of the ferrule by a predetermined distance, such as 0.8 millimeters. In addition, the optical fibers are preferably positioned such that the angled end faces are all oriented in the same manner, i.e., such that the angled end faces are generally disposed approximately within a common angled plane.

According to the present invention, an advantageous method for fabricating the array of optical fibers having respective angled end faces is provided. According to the present invention and as an initial step, the plurality of optical fibers are temporarily secured to a holding fixture. In some instances, the optical fibers may have a polymer jacket which serves either to ribbonize the plurality of optical fibers or to clad individual optical fibers. In these instances, the polymer jacket is removed from end portions of the optical fibers. See step 20 of FIG. 2. In this regard, the polymer jacket is typically stripped from the end portions of the optical fibers in a length that is at least as long as the cumulative length of the optical fibers that will be held within the holding fixture, and that will extend beyond the holding fixture and, in some instances, will also include an additional length that will permit the optical fibers to be advanced relative to the holding fixture in the event that the optical fibers need to be reworked, as described below. In one embodiment, for example, the polymer jacket is removed from end portions of the optical fibers having a length of 5 mm.

Once any jacket has been removed from end portions of the optical fibers, the optical fibers are temporarily secured to the holding fixture, which in turn, maintains the relative positions of the optical fibers during subsequent polishing operations. See step 22. While various holding fixtures may be utilized, a ferrule is advantageously utilized to hold the optical fibers during polishing operations. While the ferrule may have any standard or non-standard form factor, an MT ferrule is utilized in one embodiment to securely hold the optical fibers. In this embodiment, the optical fibers are extended through respective bores defined by the ferrule such that the end faces of the optical fibers extend beyond the front face of the ferrule by at least a predefined distance, such as by approximately 3 or 4 millimeters.

The optical fibers are then temporarily secured within the ferrule. In one advantageous embodiment, the optical fibers are temporarily secured within the ferrule by wax. However, other materials can be utilized to temporarily secure the optical fibers as long as the material can subsequently be processed so as to release the optical fibers and permit the optical fibers to be removed from the ferrule. In the embodiment in which the optical fibers are temporarily secured to the holding fixture with wax, at least those portions of the optical fibers that extend through the bores defined by the ferrule are coated with wax.

In one embodiment, the optical fibers are coated with wax by initially placing a small amount of wax upon a hot plate that has been heated to a temperature above the melting point of the wax. For example, the wax may be #300 wafer mounting wax formed of glycol phthalate and the hot plate may be heated to 85° C. The ferrule having the optical fibers extending beyond the front face thereof is then positioned such that the end faces of the optical fibers are in contact with the wax on the hot plate. The optical fibers are held in contact with the wax until the wax melts onto the ends of the optical fibers. The ferrule including the optical fibers is then lifted away from the hot plate. The ferrule is subsequently positioned on a portion of the surface of the hot plate that is free of wax. Once the wax that is carried by the ends of the optical fibers begins to melt, the optical fibers are pulled rearwardly into the ferrule such that the end faces of the optical fibers are flush with the front face of the ferrule. The optical fibers are then repeatedly advanced relative to the ferrule such that the end faces of the optical fibers protrude beyond the front face of the ferrule and subsequently pulled back into the ferrule such that the end faces of the optical fibers are approximately flush with the front face of the ferrule. This process is repeated several times, such as 3 or 4 times, so as to draw the at least partially molten wax into the bores defined by the ferrule. During this process, the optical fibers are not completely removed from the ferrule since at least the end portions of the optical fibers remain within the bores defined by the ferrule. After sliding the optical fibers back and forth several times, the optical fibers are extended relative to the ferrule until the end faces of the optical fibers protrude beyond the front face of the ferrule by at least a predefined distance, such as 0.8 millimeters or less. The ferrule including the optical fibers is then removed from the hot plate and the wax is permitted to solidify. Preferably, the solidified wax will cover the portions of the optical fibers that protrude beyond the front face of the ferrule including the end faces of the optical fibers with only a minimal amount of wax remaining on the front face of the ferrule.

Once the optical fibers have been temporarily secured to a holding fixture, the end faces of the optical fibers are polished such that a resulting polished end faces are disposed at a predefined angle, such as 45°, with respect to the longitudinal axes defined by the optical fibers. See step 24 of FIG. 2. While the end faces of the optical fibers may be polished in various manners, the ferrule is generally mounted or inserted into a polishing fixture, such as an Ultratec polishing fixture or a hand-polishing fixture. In this regard, FIGS. 3–6 depict a plurality of optical fibers temporarily secured within a ferrule 18 that, in turn, is inserted into the polishing fixture 30 of an Ultratec fiber polisher. In this embodiment, the polishing fixture includes a plate 32 defining an opening for receiving the ferrule such that the front face of the ferrule protrudes beyond a lower surface 34 of the plate. A clamp 36 and a clamp lock 38 may be mounted to posts 40 that extend outwardly from an upper surface of the plate so as to secure the ferrule within the respective opening defined by the plate. Although the clamp lock can engage the post in various manners, the clamp lock of the illustrated embodiment includes a set screw 41 or other threaded member for engaging the post. As shown, the portion of the lower surface of the plate through which the front face of the ferrule protrudes is generally disposed at an angle, such as 45°, relative to the longitudinal axes defined by the optical fibers. The polishing fixture may then be mounted within a fiber polishing apparatus 42, such as an Ultratec fiber polishing apparatus, with the portion of the lower surface of the polishing fixture through which the ferrule protrudes being positioned to engage the polishing media 44.

The end faces of the optical fibers are then polished so as to impart the predefined angle defined by the angled lower surface of the plate of the polishing fixture to the front face of the ferrule. While this angle is typically 45°, the end face may be polished at other angles if so desired. As described above, the angle defined by the end face is generally selected, based upon Snell's law, such that the desired percentage of the optical signals is internally reflected within the optical fiber.

While the end faces of the optical fibers may be polished in different manners, the specific polishing method of one embodiment will be subsequently described for purposes of illustration. In this embodiment, the end faces of the optical fibers are initially polished with a 16 micron alumna abrasive film rotating at 60 rpm. The end faces of the optical fibers are polished with the 16 micron alumna abrasive film until the portion of the front face of the ferrule that is in the vicinity of the optical fibers is free of wax. The front face of the ferrule of this embodiment is then flushed with water to remove debris and is then polished with a 9 micron alumna abrasive film rotating at 60 rpm for 45 seconds. The ferrule is then removed from the polishing fixture and the front face of the ferrule is inspected, such as by means of a 10–20× microscope. During this inspection, any wax remaining on the front face of the ferrule is then scraped away, such as by means of a razor blade. Preferably, the end face of the optical fibers are not contacted by the razor blade. The ferrule including the optical fibers is then reinserted into the polishing fixture and, in turn, into the fiber polishing apparatus and the end faces of the optical fibers and the front face of the ferrule are again polished, albeit with a 3 micron alumna abrasive film rotating at 30 rpm for two minutes. The end faces of the optical fibers are then cleaned with water and removed from the polishing fixture for further inspection. In this regard, the end faces of the optical fibers are dried, such as with dry nitrogen, and inspected under a microscope, such as a microscope at a power of 100×, to determine if the end faces of the optical fibers are free from deep scratches and the edges are sharp and free of chips. The polishing process of this embodiment is then repeated by reinserting the ferrule into the polishing fixture and, in turn, into the fiber polishing apparatus and subsequently polishing the end faces of the optical fibers and the front face of the ferrule with 1 micron alumna abrasive film rotating at 30 rpm per one minute.

Following this further polishing step, the ferrule is again removed from the polishing fixture and is inspected, such as with a microscope having a power of 100×. See step 26. If the end faces of the optical fibers are free of scratches and the edges are sharp and are not chipped, the optical fibers may be removed from the ferrule. See step 28. In those embodiments in which the optical fibers are temporarily secured within the ferrule by means of wax, the ferrule may be held on a pre-heated hot plate. Once the wax begins to melt, the plurality of optical fibers may be pulled out of the ferrule without undesirably stressing the optical fibers. The end portions of the optical fibers may then be cleaned to at least partially remove any remaining wax. See step 30. For example, the end portions of the optical fibers may be submerged in a container of acetone which, in turn, is placed in an ultrasonic cleaner. For example, the end faces of the optical fibers may be submerged within a container of acetone and placed within an ultrasonic cleaner that is activated for five minutes. The optical fibers may then be removed from the ultrasonic cleaner and from the container of acetone and dipped repeatedly in another container of clean acetone, such as by being dipped four times into a container of clean acetone, to remove any wax residue. The end portions of the optical fibers are then dried, such as by blowing dry nitrogen over the end portions of the optical fibers. The end faces of the optical fibers are then generally inspected under a microscope and recleaned, if necessary.

The plurality of optical fibers are then generally arranged in an array, such as by being inserted into another ferrule. See step 32. As before, the ferrule may have a standard form factor, such as an MT ferrule or a v-groove ferrule, or the ferrule may have any non-standard form factor that is desired. As shown in FIG. 1, the optical fibers are secured within the ferrule such that the end faces of the optical fibers extend by predefined distance beyond the front face of the ferrule, such as by about 0.5 mm. In addition, the angled end faces of the optical fibers are all generally disposed in the same orientation such that the angled end faces of the optical fibers generally lie within or approximately within a common plane. As such, the resulting array of optical fibers may be positioned relative to an optoelectronic device, such as an array of VCSELs, such that the optical signals emitted in a vertical direction by the optoelectronic device are received by respective optical fibers. The optical signals reflect from the angled end faces and propagate through respective optical fibers, typically to another optoelectronic devices, such as a detector or the like. By utilizing an array of optical fibers having respective angled end faces, the resulting optoelectronic assembly may be disposed within a relatively small package having a low profile. Additionally, the array of optical fibers permit the optoelectronic devices to be positioned close together, thereby reducing the parasitic capacitance and inductance and increasing the speed of the optoelectronic system.

In some applications, it may be desirable to coat the end faces of the optical fibers, such as with a reflective coating, an anti-reflection coating or some other thin film coating. While a reflective coating may be formed of various materials depending upon the wavelength of the signals to be reflected, one exemplary reflective coating is formed of gold that is deposited via sputtering. Similarly, while an anti-reflection coating may be formed of various materials depending on the wavelength of the signals, the anti-reflection coating of one embodiment is formed of a plurality of dielectric layers formed of silicon nitride that have been evaporatively deposited. Advantageously, the end faces of the optical fibers may be coated following polishing of the optical fibers, but prior to removing the optical fibers from the ferrule. As such, the ferrule serves as a mask during the coating process. Once the end faces of the optical fibers have been coated, the optical fibers may be removed from the ferrule in the manner described above.

Among other advantages, the method for fabricating an array of optical fibers having respective angled end faces advantageously permits the end faces of the optical fibers to be reworked without the expenditure of significant time or money in the event that one or more of the optical fibers has a defect, such as a deep scratch, a chipped edge or the like. In this regard, during the polishing and inspection process, a defect may be detected. If a defect is detected, the plurality of optical fibers may be reworked by initially at least partially releasing the optical fibers from the ferrule. See step 34. For example, the ferrule may be placed upon a preheated hot plate. Once the wax begins to melt, the optical fibers may be advanced relative to the holding fixture such that the optical fibers again protrude beyond the front face of the ferrule. See step 36. The ferrule may then be removed from the hot plate and the wax permitted to resolidify, thereby again temporarily securing the plurality of optical fibers to the ferrule. See step 38. The end faces of the optical fibers may again be polished, thereby generally removing the defect, such as the scratch or chip, such that the resulting array of optical fibers may be free of defects. As will be noted, the method of the present invention therefore permits rework of the optical fibers without scrapping the optical fibers and the ferrule while still permitting all of the optical fibers of the array to be concurrently processed, thereby increasing the efficiency of the fabrication method.

During the polishing process, the end face of the ferrule is generally also polished such that at least a portion of the front face of the ferrule has the same angle as the angle imparted to the end faces of the respective optical fibers. In this regard, the entire front face of the ferrule need not be polished to have the same angled configuration, but generally a portion of the front face of the ferrule extending from one of the major edges of the front face of the ferrule through a medial portion of the front face of the ferrule through which the end faces of the optical fibers are exposed is polished at the same angle.

The holding fixture, such as the ferrule, may be repeatedly utilized to hold other arrays of optical fibers during subsequent polishing process. Thus, the material cost associated with the method of fabricating an array of optical fibers having respective angled end faces according to the present invention is therefore further reduced. By utilizing the ferrule during multiple polishing operations, subsequent polishing operations will not require as much material to be removed from the front face of the ferrule as during the initial polishing operation to which the ferrule is subjected since, during subsequent polishing operations, at least a portion of the front face of the ferrule will generally already have the angled configuration that is being imparted to the end faces of the optical fibers. Thus, the time required to fabricate the array of optical fibers is decreased, thereby increasing the efficiency of the fabrication process.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for fabricating an array of optical fibers having respective angled end faces, the method comprising:
   temporarily securing a plurality of optical fibers to a holding fixture such that the end faces of the optical fibers are exposed, each optical fiber defining a respective longitudinal axis;
   polishing the end faces of the optical fibers while the optical fibers are temporarily secured to the holding fixture such that the polished end faces are disposed at an angle with respect to the respective longitudinal axes;
   removing the optical fibers having the angled end faces from the holding fixture; and
   arranging the optical fibers in the array following the removal of the optical fibers from the holding fixture.

2. A method according to claim 1 wherein temporarily securing the optical fibers to a holding fixture comprises:
   coating at least portions of the plurality of optical fibers with a wax; and
   permitting the wax to at least partially solidify to thereby secure the plurality of optical fibers to the holding fixture.

3. A method according to claim 2 further comprising at least partially melting the wax prior to removing the optical fibers from the holding fixture.

4. A method according to claim 2 further comprising cleaning the optical fibers following removal from the holding fixture to at least partially remove the wax.

5. A method according to claim 1 wherein temporarily securing the optical fibers to a holding fixture comprises temporarily securing the optical fibers within a first ferrule.

6. A method according to claim 5 wherein arranging the optical fibers in the array comprises mounting the optical fibers within a second ferrule.

7. A method according to claim 5 wherein polishing the end faces of the optical fibers comprises concurrently polishing both the end faces of the optical fibers and a front face of the first ferrule such that the end faces of the optical fibers and at least that portion of the front face of the first ferrule proximate the end faces of the optical fibers are disposed at the same angle.

8. A method according to claim 1 further comprising coating the polished end faces of at least some of the optical fibers with one of a reflective coating and an anti-reflective coating prior to removing the optical fibers from the holding fixture.

9. A method according to claim 1 further comprising:
   detecting a defect in at least one of the optical fibers prior to removing the optical fibers from the holding fixture;
   at least partially releasing the plurality of optical fibers from the holding fixture;
   advancing the plurality of optical fibers relative to the holding fixture following the at least partial release of the optical fibers;
   temporarily securing the plurality of optical fibers to the holding fixture following the advancement of the optical fibers; and
   polishing the end faces of the optical fibers following the advancement of the optical fibers and while the optical fibers are temporarily secured to the holding fixture.

10. A method for fabricating an array of optical fibers having respective angled end faces, the method comprising:
    coating at least portions of a plurality of optical fibers with a wax;
    permitting the wax to at least partially solidify to thereby secure the plurality of optical fibers to a holding fixture such that the end faces of the optical fibers are exposed, each optical fiber defining a respective longitudinal axis; and
    polishing the end faces of the optical fibers while the optical fibers are secured to the holding fixture such that the polished end faces are disposed at an angle with respect to the respective longitudinal axes.

11. A method according to claim 10 further comprises disposing the optical fibers within a first ferrule such that the at least partial solidification of the wax secures the optical fibers therewithin.

12. A method according to claim 11 wherein polishing the end faces of the optical fibers comprises concurrently polishing both the end faces of the optical fibers and a front face of the first ferrule such that the end faces of the optical fibers and at least that portion of the front face of the first ferrule proximate the end faces of the optical fibers are disposed at the same angle.

13. A method according to claim 10 further comprising coating the polished end faces of at least some of the optical fibers with one of a reflective coating and an anti-reflective coating.

14. A method according to claim 10 further comprising removing the polished optical fibers having the angled end faces from the holding fixture.

15. A method according to claim 14 further comprising at least partially melting the wax prior to removing the optical fibers from the holding fixture.

16. A method according to claim 14 further comprising cleaning the optical fibers following removal from the holding fixture to at least partially remove the wax.

17. A method according to claim 14 further comprising arranging the optical fibers in the array following the removal of the optical fibers from the holding fixture.

18. A method according to claim 17 wherein arranging the optical fibers in the array comprises mounting the optical fibers within a second ferrule.

19. A method according to claim 10 further comprising:
   detecting a defect in at least one of the optical fibers;
   at least partially melting the wax;
   advancing the plurality of optical fibers relative to the holding fixture once the wax is at least partially molten;
   permitting the wax to at least partially resolidify to thereby secure the plurality of optical fibers to the holding fixture following the advancement of the optical fibers; and
   polishing the end faces of the optical fibers following the advancement of the optical fibers and while the optical fibers are secured to the holding fixture.

20. A method for fabricating an array of optical fibers, the method comprising:
   temporarily securing a plurality of optical fibers to a holding fixture such that the end faces of the optical fibers are exposed;
   polishing the end faces of the optical fibers while the optical fibers are temporarily secured to the holding fixture;
   detecting a defect in at least one of the optical fibers;
   at least partially releasing the plurality of optical fibers from the holding fixture;
   advancing the plurality of optical fibers relative to the holding fixture following the at least partial release of the optical fibers;
   temporarily securing the plurality of optical fibers to the holding fixture following the advancement of the optical fibers; and
   polishing the end faces of the optical fibers following the advancement of the optical fibers and while the optical fibers are temporarily secured to the holding fixture.

21. A method according to claim 20 further comprising:
   removing the optical fibers from the holding fixture after polishing the end faces of the advanced optical fibers; and
   arranging the optical fibers in the array following the removal of the optical fibers from the holding fixture.

22. A method according to claim 20 wherein temporarily securing the optical fibers to a holding fixture comprises:
   coating at least portions of the plurality of optical fibers with a wax; and
   permitting the wax to at least partially solidify to thereby secure the plurality of optical fibers to the holding fixture.

23. A method according to claim 22 wherein releasing the optical fibers from the holding fixture comprises at least partially melting the wax prior to advancing the optical fibers relative to the ferrule.

24. A method for fabricating an array of optical fibers having respective angled end faces, the method comprising:
   temporarily securing a plurality of optical fibers within a first ferrule with wax that coats at least portions of the optical fibers, each optical fiber defining a respective longitudinal axis;
   polishing the end faces of the optical fibers while the optical fibers are temporarily secured within the first ferrule such that the polished end faces are disposed at an angle with respect to the respective longitudinal axes;
   removing the optical fibers having the angled end faces from the first ferrule; and
   mounting the optical fibers within a second ferrule such that the angled end faces extend therefrom.

25. A method according to claim 24 wherein temporarily securing the optical fibers within the first ferrule comprises:
   coating at least portions of the plurality of optical fibers with the wax; and
   permitting the wax to at least partially solidify to thereby secure the plurality of optical fibers to the first ferrule.

26. A method according to claim 24 wherein polishing the end faces of the optical fibers comprises concurrently polishing both the end faces of the optical fibers and a front face of the first ferrule such that the end faces of the optical fibers and at least that portion of the front face of the first ferrule proximate the end faces of the optical fibers are disposed at the same angle.

27. A method according to claim 24 further comprising at least partially melting the wax prior to removing the optical fibers from the first ferrule.

28. A method according to claim 24 further comprising cleaning the optical fibers following removal from the first ferrule to at least partially remove the wax.

29. A method according to claim 24 further comprising coating the polished end faces of at least some of the optical fibers with one of a reflective coating and an anti-reflective coating prior to removing the optical fibers from the first ferrule.

30. A method according to claim 24 further comprising:
   detecting a defect in at least one of the optical fibers prior to removing the optical fibers from the holding fixture;
   at least partially melting the wax;
   advancing the plurality of optical fibers relative to the holding fixture once the wax has been at least partially melted;
   temporarily securing the plurality of optical fibers to the holding fixture with the wax following the advancement of the optical fibers; and
   polishing the end faces of the optical fibers following the advancement of the optical fibers and while the optical fibers are temporarily secured to the holding fixture.

* * * * *